Patented Apr. 3, 1928.

1,664,981

UNITED STATES PATENT OFFICE.

DONALD W. HOWE, EARLE R. PICKETT, AND DOUGLAS M. McBEAN, OF CANAJOHARIE, NEW YORK, ASSIGNORS TO BEECH-NUT PACKING COMPANY, OF CANAJOHARIE, NEW YORK, A CORPORATION OF NEW YORK.

METHOD OF CLEANING CHICLE AND SIMILAR GUMS.

No Drawing. Application filed July 13, 1925, Serial No. 43,433. Renewed September 2, 1927.

Our invention relates to the cleaning of chicle and similar gums, such as Pontianak and the like and has for its object to separate the gum content from mechanical impurities which may be found in it such as bark, saw-dust, sand and the like. It is of particular value for the cleaning of chicle and similar gum waste containing high percentages of sand or bark or saw-dust, etc., such as press cake, sandy and low quality gum of all of such impurities. Heretofore gums containing high percentages of such impurities have been of such little value, on account of the lack of any practical method of cleaning them, that they have been discarded, being usually burned as rubbish so as to get them out of the way.

Our method overcomes the difficulties heretofore experienced in the attempted use of solvents, which difficulties have made the solvent method impractical. Practically all solvents have fire hazards. The complete recovery of the solvents from the gum is extremely difficult and the solvents affect the quality of the gum. Solvent recovered chicle, moreover, hardens very slowly. With our method the gum recovered is substantially as good as high grade gum and can be used in the manner in which high grade gum is used.

In carrying out our method, we emulsify the gum content of the material in water. Gums such as chicle, Pontianak, etc., have no affinity for water so that any substance which is wetted by water will not adhere to these gums when in sub-divided condition. The emulsification finely divides the gums, and the foreign materials wetted by water have sufficient room in the emulsion to free themselves and become separated from the gum by reason of the lack of adherence referred to. The gum emulsion can be filtered and the foreign materials separated.

In the preferred method of treating the gum, the material to be treated is ground or broken into small lumps, the finer the division the better. It is then placed in a steam-jacketed kettle or other container which can be heated. Water is added sufficient to cover the material. A proportion of water which acts satisfactorily is about twice the bulk of the material treated. The amount of water, however, will stand considerable variation. If necessary, emulsifying agents such as dextrin, gum arabic, soaps, casein, albumins, starch, etc., are added. With press cake and most waste materials, however, the addition of emulsifying agents is unnecessary, since the water soluble materials in the bark and saw-dust, and also the natural emulsifying agents in the gum, are sufficient.

The mixture of gum bearing material and water is heated until the gum is liquefied and is meanwhile agitated by a stirrer or beater. Boiling and beating facilitate the emulsification of the gum. Boiling, however, is not necessary, provided the mixture is hot enough to keep the gum in a melted or fluid condition, since with the gum in that condition beating alone will bring about the emulsification.

After the emulsification is accomplished the bark and lighter products rise to the surface. The saw-dust, sand and similar impurities sink to the bottom. The top surface of the emulsion, together with the bark and lighter impurities, is removed and bark, etc., separated from the accompanying fluid by a suitable filter which for most purposes need be only a strainer. The bark and lighter impurities are then removed from the strainer and discarded. The remainder of the emulsion with the saw-dust and sand is then poured into the strainer so as to separate out the saw-dust. The saw-dust recovered in this manner is preserved and is suitable for use in filter presses for filtering high grade chicle in the ordinary manner in filter presses. This saving of saw-dust is a substantial saving, the saw-dust being ordinarily hard wood saw-dust such as maple saw-dust and having a substantial value.

If the emulsion, after the removal of the saw-dust, contains sand it is run into a kettle adapted to be heated, such as a steam-jacketed kettle, and mixed with approximately an equal amount of water. It is then brought to the boiling point. After boiling vigorously the gum rises to the surface and the sand sinks to the bottom. The gum is then skimmed off like cream and deposited in containers into which a considerable quantity of water has previously been placed. Enough water is added to the containers to reduce the temperature to between 30° centigrade and 50° centigrade, preferably about 40° centigrade. The portion containing the sand is discharged and permitted to go to waste. The water containing the skimmed off gum deposited in the containers is then stirred, preferably by a circular motion of the stirrer adjacent to the center of the container, which causes the gum to coagulate or collect upon the stirrer in a cohering mass, which is then removed by hand. This mass is then passed through a wringer, in the presence of a stream of water, so as to squeeze out some of the occluded water. This product is then placed in containers, where it soon stiffens, and can then be treated the same as the high grade gum of commerce. The water from which the coagulated gum is removed may be then placed in a boiling kettle and used to dilute another lot of strained emulsion therein.

If desired, sand containing emulsion after the saw-dust has been removed may be filtered through a finer strainer so as to remove substantially all the sand in that manner. The emulsion after the saw-dust has been removed, if it contains no sand, or after the sand has been removed by a sand strainer, can be coagulated without passing it through the boiling kettle. In order to do this we discharge this emulsion into a container, mixing it with about its equal amount of cool water so as to produce a mixture having a temperature between 30 and 50° C., preferably about 40° C. This breaks the emulsion and by stirring it as above the gum is caused to coagulate into a mass, whereupon it is removed by hand and passed through a wringer as before and thereafter permitted to harden.

Instead of diluting the filtered emulsion and stirring it, the undiluted filtered emulsion may be permitted to cool by standing over night, in which case the gum in part sinks to the bottom and in part rises to the top. The liquid can then be removed and the gum worked into a cohering mass and passed through a wringer as before.

If it is desired to retain the soluble constituents of the gum, the water in the filtered emulsion can be evaporated in a suitable evaporating mechanism such as a vacuum pan, thus recovering the gum and the soluble material. If this is done the contents of the vacuum pan should be continuously stirred during the evaporating process so that the soluble material will be thoroughly distributed throughout the recovered mass. As about 2 or 3 per cent of the raw chicle or similar gum is soluble material which ordinarily is retained when high grade gum is used for the manufacture of chewing gum, this saving of the soluble material is an advantage.

Instead of relying upon dilution and cooling alone for breaking the emulsion, the emulsion can be broken by the addition of acids such as acetic, sulphuric, etc., or salts such as alum, sodium chloride, sodium sulphate, etc. When such addition agents are used, however, the gum should be recovered by stirring and the remaining liquid should then be discarded.

The fastest method of breaking the emulsion and coagulating the gum is by diluting the emulsion by pouring it into cold water, bringing the temperature down to approximately 40° C. and then stirring as above described, and, all things considered, that is believed to be the preferable procedure except where the filtered emulsion contains sand, in which case it should be boiled and skimmed and the skimmed off gum plunged into water and coagulated by stirring as described. By similar gums we mean any gummy substances which become fluid when heated and can be emulsified when in that condition and subsequently coagulated substantially as described.

The process above described results in no apparent detrimental change in the gum.

As will be evident to those skilled in the art, our invention permits of various modifications without departing from the spirit thereof or the scope of the appended claims.

What we claim is:

1. The method of cleaning chicle and similar gums, which consists in emulsifying the gum in water hot enough to liquefy the gum, filtering the emulsion thus produced, and separating the gum and excess water of said filtered emulsion.

2. The method of cleaning chicle and similar gums, which consists in emulsifying the gum in water hot enough to liquefy the gum, skimming the lighter impurities from the surface of the resulting emulsion, filtering what is left, and separating the gum from the excess water of said filtered emulsion.

3. The method of cleaning chicle and similar gums, which consists in emulsifying the gum in a liquid hot enough to liquefy the gum, filtering the emulsion, breaking the filtered emulsion and collecting the gum from the broken emulsion.

4. The method of cleaning chicle and similar gums, which consists in emulsifying the gum in a liquid hot enough to liquefy the gum, filtering the emulsion, breaking the filtered emulsion, collecting the gum from the broken emulsion and forming it into a cohering mass.

5. The method of cleaning chicle and similar gums, which consists in emulsifying the gum in a liquid hot enough to liquefy the gum, filtering the emulsion thus produced, boiling the filtrate, removing the gum from the surface thereof, subjecting the removed gum to the action of cool water and stirring the cool water and gum until the gum collects in a cohering mass.

6. The method of cleaning chicle and similar gums, which consists in emulsifying the gum in a liquid hot enough to liquefy the gum, filtering the emulsion thus produced, boiling the filtrate, removing the gum from the surface thereof, subjecting the removed gum to the action of cool water, stirring the cool water and gum until the gum collects in a cohering mass, and extracting the excess water from said mass.

7. The method of cleaning chicle and similar gums, which consists in emulsifying the gum in a liquid hot enough to liquefy the gum, filtering the emulsion thus produced, boiling the filtrate, removing the gum from the surface thereof, subjecting the removed gum to the action of cool water, stirring the cool water and gum until the gum collects in a cohering mass, and wringing the excess water from said mass.

8. The method of cleaning chicle and similar gums, which consists in emulsifying the gum in a liquid hot enough to liquefy the gum, filtering the emulsion thus produced, boiling the filtrate, removing the upper portion thereof, combining said upper portion with cool water so as to reduce its temperature to from 30 to 50° C. and stirring the cool water and gum until the gum collects in a cohering mass.

9. The method of cleaning chicle and similar gums, which consists in emulsifying the gum in a liquid hot enough to liquefy the gum, filtering the emulsion thus produced, boiling the filtrate, removing the upper portion thereof, combining said upper portion with cool water so as to reduce its temperature to from 30 to 50° C., stirring the cool water and gum until the gum collects in a cohering mass, and removing the excess water therefrom.

10. In the method of cleaning chicle and similar gums, the improvement which consists in forming a hot emulsion of substantially pure gum and water the temperature being high enough to liquefy the gum, filtering the emulsion, cooling the filtered emulsion with water to from 30 to 50° C. and stirring the cooled mixture so as to form the gum into a cohering mass.

In testimony whereof, we have signed our names to this specification this ninth day of July, 1925.

DONALD W. HOWE.
EARLE R. PICKETT.
DOUGLAS M. McBEAN.